Aug. 17, 1965 J. STARK, JR 3,201,642
AUGMENTED B-BOOST VOLTAGE SUPPLY
Filed March 8, 1963
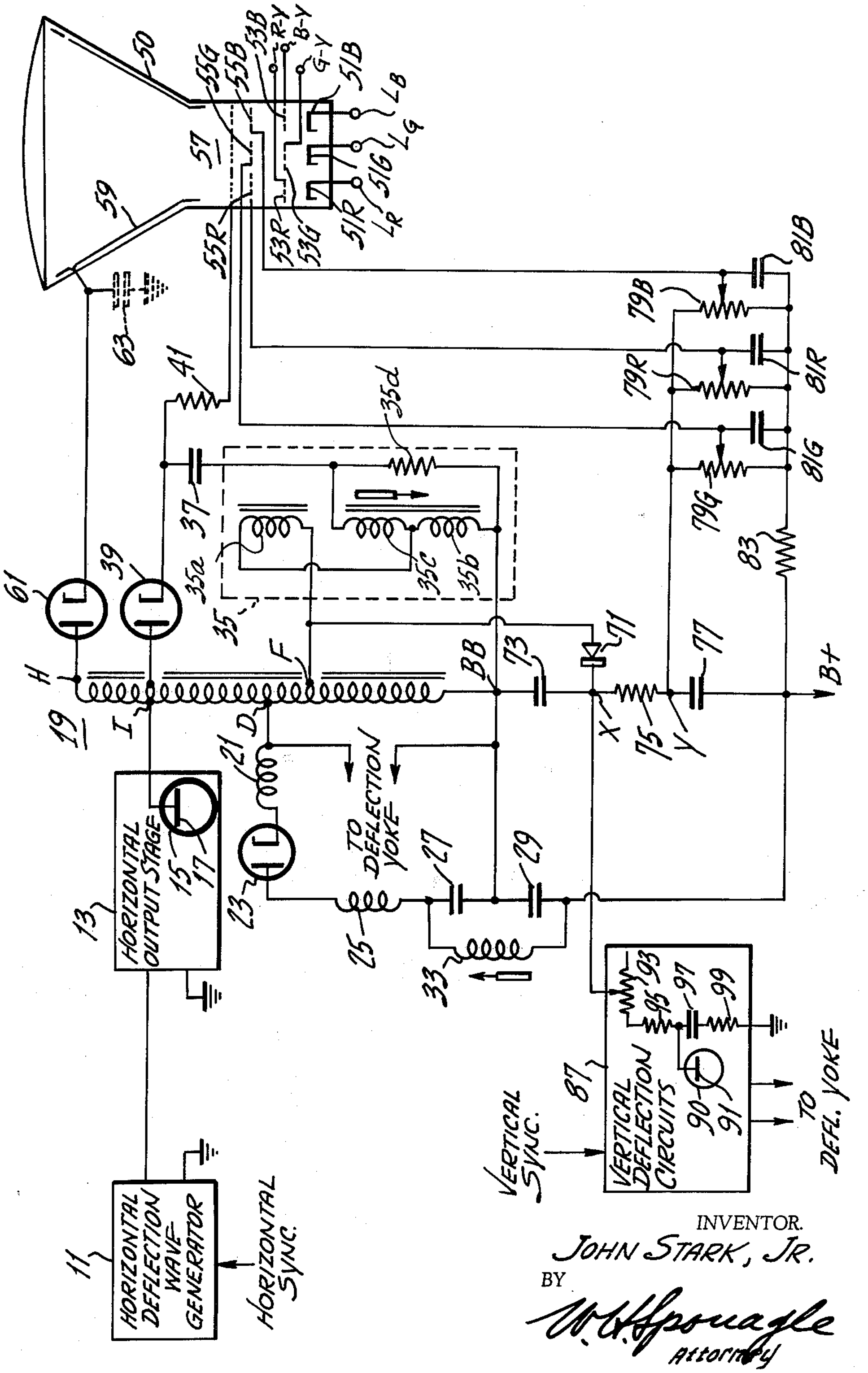
INVENTOR.
JOHN STARK, JR.
BY
W. H. Sprague
Attorney United States Patent Office 3,201,642

Patented Aug. 17, 1965

3,201,642

AUGMENTED B-BOOST VOLTAGE SUPPLY

John Stark, Jr., Indianapolis, Ind., assignor to Radio Corporation of America, a corporation of Delaware Filed Mar. 3, 1963, Ser. No. 263,786
4 Claims. (Cl. 315—27)

The present invention generally relates to voltage supplies, and particularly, to improved voltage supplies for satisfying voltage requirements associated with the operation of a cathode ray tube.

A form of cathode ray tube widely employed in color television receivers is the tri-gun, shadow mask color kinescope. For producing satisfactory operation of such a color kinescope, a relatively high D.C. voltage (of the order of 24 kv., for example) is required for the final accelerating or ultor electrode of the tube. Additional, an adjustable intermediate high voltage (of the order of 4900 volts, for example) is required by the focusing electrode structure of the kinescope. Also, operating voltages in a range higher than that provided by the usual low voltage supply of a color television receiver are needed for the respective screen grid electrodes of the kinescope, three electron guns.

In accordance with kinescope set-up procedure that have proved to be highly advantageous, and which are described, for example, in the RCA Color Television Service Data pamphlet designated 1962 No. T6, it is desirable that the respective screen grid voltages be individually adjustable over a relatively wide range in order to permit suitable matching of the respective gun cut-off characteristics. In the RCA CTC–12 color television chassis described in the aforementioned service data pamphlet, individual potentiometers, bridged between the receiver's B+ supply (390 volts) and the B–boost voltage source conventionally associated with the receiver's horizontal deflection system, permits selection of each screen grid potential in a range extending to an upper limit of 750 volts. A common dropping resistor in the B+ return of the potentiometers imposes a lower range limit of approximately 570 volts.

It has been found that, for ease in the gun matching steps of the set-up procedure and for maximum utilization of the brightness capabilities of the color kinescope, it would be desirable to extend the range of adjustment of the screen grid electrode potentials to voltages higher than the approximately 750 volts maximum available from the usual B–boost voltage source.

In accordance with the present invention, a novel augmented B-boost voltage supply arrangement is established in association with the receiver's horizontal deflection circuitry, whereby the extended range of screen grid voltage adjustment is rendered feasible with relatively little added expense. The augmented B-boost voltage provided by the novel supply of the present invention is also useful in conjunction with the sawtooth wave generating circuitry of the receiver's vertical deflection arrangement, whereby improvement in linearity of the vertical sweep may be simply achieved. Additional utilizations of the augmented B-boost voltage are also feasible with attendant performance improvements or circuit simplifications.

In accordance with an embodiment of the present invention, the series combination of an inexpensive semiconductor diode and a filter capacitor is coupled between a relatively low pulse potential tap on th horizontal output transformer and the B-boost (A.C. ground return)

terminal of the transformer. The diode rectifies the flyback pulses appearing across this portion of the transformer to develop a charge across the added capacitor in such a direction as to add to the B-boost terminal voltage, producing at the junction of the diode and filter capacitor an augmented B-boost voltage.

In accordance with a particular embodiment of the present invention, a tap already provided on the transformer for derivation of an adjustable "bucking" pulse for the receiver's adjustable focus supply is utilized as the tap to which the added diode is connected. With such an arrangement, an augmented B-boost voltage of the order of 1200 volts has been obtained. Use of a voltage of this order as the charging voltage for the sawtooth wave capacitor in the receiver's vertical deflection circuits permits an improvement in vertical linearity over that obtained using the usual B-boost voltage supply as the charging source.

In further accordance with the embodiment of the present invention, the series combination of a dropping resistor and an additional filter capacitor has been coupled between the added capacitor-diode junction and the receiver's B+ supply to provide, at the junction of the dropping resistor and additional filter capacitor, a high potential coupling point for the individual screen grid potentiometers previously discussed, whereby screen grid voltage adjustment range for each may be conveniently extended to an upper limit of the order of approximately 1100 volts.

The noted improvements in vertical linearity and kinescope operation and set-up are accordingly achieved at the moderate expense of adding a crystal diode, one resistor, and a pair of filter capacitors. In the described circuit arrangement, the diode requires only a moderate inverse voltage rating, comparable to the flyback pulse height at the selected transformer tap, which, in the given example, is only of the order of 450 volts. The described circuit arrangement also permits use of relatively low voltage rating filter capacitors; the first-named filter capacitor only requires a voltage rating of the order of the 450 volt pulse height, while the second-named filter capacitor only requires a voltage rating comparable to the difference between the receiver's B+ potential and the potential at the output terminal side of the added dropping resistor (a voltage difference of the order of 700 volts).

In accordance with further contemplated embodiments of the present invention, other utilizations of the augmented B-boost voltage are made in addition to, or in place of, the above described utilizations. Such other contemplated utilizations include use of the augmented B-boost voltage as the plate voltage source for the receiver's sound detector, and use of the augmented B-boost voltage source to supply a sample for control of the shunt regulator conventionally associated with the receiver's high voltage supply which energizes the kinescope's ultor electrode.

An object of the present invention is to provide a novel voltage supply for meeting voltage requirements of a cathode ray tube and/or its associated deflection circuits.

An additional particular object of the present invention is to provide a novel and improved B–boost voltage supply for a color television receiver, whereby to obtain improved operation of a color kinescope and its associated circuits.

Other objects and advantages of the present invention will be readily apparent to those skilled in the art upon a reading of the following detailed description and an inspection of the accompanying drawing in which a portion of a color television receiver comprising a color kinescope and associated biasing and beam deflecting circuitry is illustrated, partially in block diagram form and partially in schematic detail, the associated circuitry incorporating an augmented B-boost voltage supply in accordance with an embodiment of the present invention.

The color kinescope 50 is of the tri-gun, shadow mask type. The electrode structure of the color kinescope 50 includes a trio of cathodes 51R, 51G and 51B, a trio of control grids 53R, 53G and 53B, and a trio of screen grids 55R, 55G and 55B. Separate leads to each of these electrodes is provided in order to effect individual energization thereof.

The focusing electrode structure 57 associated with the three guns of the color kinescope is commonly energized, and accordingly provided with a single energizing lead. The color kinescope 50 is also provided with a final accelerating or ultor electrode 59, which, in its usual form, comprises a conductive coating on the inner surface of the kinescope bulb extending from the beam deflection region of the tube to the vicinity of the display screen of the tube.

Circuitry for energizing the cathode and control grid electrodes of the kinescope 50 have not been shown in the drawing, since the invention is not directly concerned with the details thereof. It is simply indicated in the drawing that the respective cathodes 51R, 51G and 51B are connected to respective energizing terminals $L_R$, $L_G$ and $L_B$; similarly, the respective control grids 53R, 53G and 53B are indicated as being connected to energizing terminals R–Y, G–Y and B–Y. The circuitry coupled to the terminals $L_R$, $L_G$, $L_B$ and R–Y, G–Y and B–Y may, for example, comprise the circuitry energizing the comparable electrodes of the color kinescope in the RCA CTC–12 color television chassis illustrated in the previously mentioned RCA Service Data pamphlet. In such a chassis, the respective cathode electrodes receive a common luminance signal input, in relative magnitudes, however, which are adjustable. The cathode driving circuitry supplies an operating cathode bias to the respective cathodes, and the luminance signal coupling thereto is adapted to pass the D.C. component of the luminance signal portion of the received composite signal.

In the designated color television chassis, the circuitry associated with the kinescope control grids supplies respectively appropriate color-difference signals (of the form R–Y, G–Y and B–Y) to the individual control grids. The control grid driving circuitry effects D.C. coupling of the color-difference signals to the respective control grids, and supplies an operating control grid bias thereto.

Associated with the color kinescope 50 in the conventional manner, but not illustrated in the drawing for simplicity's sake, is a deflection yoke adapted to cause the three electron beams of the kinescope to trace a scanning raster on the display screen. Circuitry for energizing the horizontal (line) windings of the deflection yoke includes a horizontal deflection wave generator 11, responsive to horizontal synchronizing pulses derived from the received composite signal, for developing a horizontal sweep signal suitable for application to a horizontal output stage 13. The horizontal output stage 13, incorporating a suitable power tube 15 (partially illustrated), drives a current of suitable sawtooth wave shape through the horizontal windings of the deflection yoke. Coupling of the driver tube 15 to the deflection yoke is effected by means of a horizontal output transformer 19.

The transformer 19 comprises a plurality of winding sections defined by a number of transformer taps and terminals, and is suitably connected to effect a step-down autotransformer type coupling of the output stage 13 to the deflection yoke, as well as a step-up autotransformer type coupling of the output stage 13 to a high voltage rectifier 61. The plate 17 of the driver tube 15 is connected to an input tap I of the transformer 19. The winding portion of the transformer 19 extending between the input terminal I and one end terminal BB thereof comprises the primary winding of the autotransformer coupling to the deflection yoke. A portion of the I–BB winding section extending between terminal BB and the terminal D located intermediately on this winding section constitutes the secondary winding of the yoke-driving autotransformer, and the horizontal windings of the deflection yoke are accordingly coupled thereacross.

The I–BB winding section of transformer 19 also comprises the primary of the high voltage step-up autotransformer. The high voltage rectifier input electrode is connected to the other end terminal H of the transformer 19, and the H–BB winding, comprising the H–I winding section as well as the I–BB winding section, constitutes the step-up secondary winding.

The flyback pulses periodically developed across the deflection yoke during the line scanning retrace intervals appear with stepped up amplitude at the terminal H, and are rectified by diode 61 to develop the high D.C. voltage (e.g., 24 kv.) required by the ultor electrode 59. The output of the high voltage rectifier 61 is suitably filtered by the capacitor 63. This capacitor, shown in dotted lines on the drawing, is conventionally formed by the cooperation of the ultor electrode coating on the inside of the kinescope bulb with a grounded conductive coating of similar extent on the outside surface of the kinescope bulb.

An energizing potential for the focusing electrode structure 57 of the kinescope 50 is also derived from the flyback pulses appearing across the windings of the transformer 19 through the use of circuitry including a focus rectifier 39. The input electrode of focus rectifier 39 is directly connected to terminal I of transformer 19, while the output electrode of rectifier 39 is connected via a dropping resistor 41 to the focusing electrode structure 57. The flyback pulse magnitude at terminal I is such as to result in a nominal D.C. output of rectifier 39 of a magnitude intermediately located in the range of desired focusing voltages.

Adjustment of the actual focusing voltage employed within the noted range is accomplished through the use of additional structure 35, 37 adapted to supply to the rectifier output electrode an additional pulse input of adjustable amplitude and polarity, whereby the potential on the focusing electrode structure 57 may be adjusted both above and below the nominal focus rectifier output level.

Structure 35 incorporates a trio of inductive windings (input winding 35*a*, output winding 35*c*, and common winding 35*b*) mounted (in the order named) on a common core, with a damping resistor 35*d* across a pair of these windings (35*c* and 35*b*); the output of structure 35 is coupled to the focus rectifier cathode by means of a coupling capacitor 37 (which serves also as the focus supply filter capacitor). Movement of the common core varies the effective pulse voltage division at the junction of windings 35*a* and 35*b*, and further serves to differentially vary the 35*a*–35*c* and 35*b*–35*c* couplings (which effectively are mutually oppositely poled). Operation of the structure 35 requires a flyback pulse input of moderate amplitude, which is obtained in the illustrated circuit by coupling of the input terminals of structure 35 to the end terminal BB of transformer 19 and to a pulse takeoff terminal (tap F) on the transformer located between terminals D and BB. Illustratively, the flyback pulse amplitude at tap F is of the order of 450 volts, and processing of a pulse input of this magnitude by structure 35 permits adjustment of focus voltage in a range of 4300 volts to 5150 volts.

Also associated with the horizontal output transformer 19 is a damper diode 23, which is utilized in familiar fashion to achieve reaction scanning and to achieve power recovery of the so-called B-boost type. For this purpose, the cathode of damper diode 23 is connected (via choke 21) to the intermediate terminal D of transformer 19. The anode of damper diode 23 is connected to the receiver's B+ supply by a direct current path comprising choke 25 and a linearity coil 33. The anode of damper diode 23 is also coupled via choke 25 in series with capacitor 27 to the end terminal BB of transformer 19. Periodic conduction by damper diode 23 develops a charge across capacitor 27 in such a direction as to add to the B+ potential appearing at the damper anode, resulting in an augmented B+ voltage at terminal BB. This augmented B+ voltage, which, for example, in a receiver providing a B+ voltage of 390 volts, may be of the order of 750 volts, is commonly called a B-boost voltage. In addition to serving to improve the efficiency of the horizontal deflection circuitry by effectively providing an augmented plate voltage for the horizontal driver tube, the B-boost voltage developed in the manner described above is often used in television receivers for additional purposes where an augmented voltage of the noted order is found desirable.

The present invention, however, recognizes that the conventional B-boost supply arrangement is subject to improvement in meeting the voltage supply requirements of a color television receiver. The present invention supplements the usual B-boost voltage supply with a few, relatively inexpensive, added components to provide the receiver with, in addition to the usual B-boost voltage, an augmented B-boost voltage of significant usefulness. The added components shown in the drawing include a semiconductor diode 71 connected in series with a filter capacitor 73, the series combination thus formed being connected between tap F and terminal BB of the transformer 19.

The diode 71 is poled in a manner opposite to that of the damper diode 23. The added diode 71 conducts during each positive flyback pulse appearance to develop a charge on capacitor 73 in such a direction as to add to the B-boost voltage appearing at terminal BB. As a result, there appears at the junction of diode 71 and filter capacitor 73 an augmented B-boost potential. With the illustrative values given for the circuit of the drawing, the augmented B-boost voltage appearing at the junction point (designated X in the drawing) will be of the order of 1200 volts.

A first use to be described for this augmented B-boost voltage is one associated with the vertical deflection circuits 87 of the partially illustrated receiver. The vertical deflection circuits 87, which respond to vertical synchronizing pulses derived from the received composite signal to develop vertical (field) scanning waves for energizing the vertical windings of the deflection yoke, have not been illustrated in full schematic detail in the drawing. However, a simplified showing of a saw-tooth voltage wave generating circuit is presented schematically in the drawing to demonstrate use of the augmented B-boost voltage as a sawtooth charging voltage.

A capacitor 97 is connected in series with a resistor 99 between the plate 91 of a partially illustrated vertical discharge tube 90 and chassis ground. One fixed terminal of a potentiometer 93 is connected by means of a resistor 95 to the plate 91, while the other end terminal is left unconnected. The movable tap on potentiometer 93 is directly connected to terminal X, at which appears the augmented B-boost voltage. The resistance presented by resistor 95 in series with a selected portion of the resistance of potentiometer 93 is large compared with the resistance of resistor 99.

When the discharge tube 90 is not conducting, the capacitor 97 charges at a substantially linear rate determined primarily by the value of resistor 95. Discharge tube 90 is periodically rendered conducting for a brief period; the capacitor 97 is discharged by the conducting tube at a relatively rapid rate determined by the impedance of the conducting tube 90 and the resistance value of resistor 99. The voltage waveform developed at plate 91 is a substantially sawtooth waveform. The short retrace portion of the sawtooth is inclusive of a pulse component due to the presence of resistor 99, serving a familiar peaking function. The linearity of the long trace portion of the developed sawtooth voltage wave is enhanced by the use of the augmented B-boost voltage circuitry as the charging voltage source, since it presents a higher charging voltage than could be otherwise obtained from the usual unaugmented B-boost voltage source.

The remaining portions (not illustrated schematically) of the vertical deflection circuits 87 may comprise suitable means for utilizing the sawtooth voltage wave developed at plate 91 to cause a sawtooth current to flow through the vertical windings of the deflection yoke. Details of such circuitry may be as shown in the aforementioned RCA Service Data pamphlet.

As noted previously, it is desirable to provide individually adjustable sources of bias for the respective screen grids 55R, 55G and 55B of the color kinescope 50. For this purpose, a trio of potentiometers, 79R, 79G and 79B, are provided, with the adjustable tap of each connected to the respectively appropriate screen grid. One end terminal of each of the three potentiometer is connected via a common dropping resistor 83 to the B+ supply of the receiver. The remaining end terminals are connected in common via a resistor 75 to the terminal X of the augmented B-boost voltage supply. A filter capacitor 77 is coupled between the receiver's B+ supply and the end of resistor 75 remote from the terminal X. The junction of resistor 75 and capacitor 77 serves as an additional output terminal (Y) of the augmented B-boost voltage supply, the voltage available at terminal Y being an augmented B-boost voltage of somewhat lower potential than that available at terminal X but of greater freedom from ripple due to the supplemental filtering action of components 75–77. In a system employing the illustrative values mentioned previously, the voltage at terminal Y is of the order of 1100 volts, and the range of adjustment for each of the screen grid bias potentiometers extends from approximately 500 volts to 1100 volts. The availability of potentials in this range at each potentiometer tap tends to simplify those set-up procedures which are utilized to effect matching of the cut-off characteristics of the three guns of color kinescope 50, as previously discussed. The bypass capacitors 81G, 81R and 81B (each coupled between a potentiometer tap and the common dropping resistor 83) minimize the appearance of pulse components or other variations at the respective screen grids.

While two specific uses for the augmented B-boost voltage developed per the present invention have been illustrated and discussed in detail, it should be readily appreciated that additional uses are also contemplated. One example is use of the augmented B-boost voltage in the receiver's sound detector circuitry: e.g., providing the plate voltage for the 6GX6 sound demodulator tube in the CTC–12 receiver illustrated in the aforementioned RCA Service Data pamphlet. Another example is use of the augmented B-boost voltage in the receiver's high voltage regulator circuitry: e.g., providing the loading-responsive voltage sample for the control grid of the 6BK4 shunt regulator tube in said CTC–12 receiver. Other low current drain uses are also feasible.

It should be noted that the deflection circuit illustrations in the drawing are simplified relative to the complete circuitry usually required in actual color receiver use. Modification of the illustrated circuit to incorporate such omitted features as the aforementioned high voltage regulator, provision for electrical centering adjustment, etc., may readily be effected, following, for example, the circuit arrangement for such features in the aforementioned CTC–12 receiver.

Presented in the table below is a set of values for certain parameters of the illustrated circuit which has proved satisfactory in operation. It will be appreciated that these values are given by way of example only.

| | |
|---|---|
| Capacitor 27 | .068 microfarad. |
| Capacitor 29 | .082 microfarad. |
| Capacitor 73 | .01 microfarad. |
| Capacitor 77 | .01 microfarad. |
| Capacitors 81G, R&B | 1000 micromicrofarads (ea.) |
| Capacitor 97 | .036 microfarad. |
| Resistor 75 | 100,000 ohms. |
| Potentiometers 79G, R&B | 1.5 megohm (each) |
| Resistor 83 | 100,000 ohms. |
| Potentiometer 93 | 3.4 megohms. |
| Resistor 95 | 2.2 megohms. |
| Resistor 99 | 24,000 ohms. |
| Chokes 21, 25 | 5.6 microhenry (each) |
| Diode 23 | 6DW4 |
| Diode 71 | EDI selenium rectifier |

What is claimed is

1. In combination with a cathode ray tube deflection circuit including a source of deflection waves having periodically recurring retrace portions, a deflection wave transformer comprising a winding including an input terminal and an end terminal, said deflection wave source being coupled between said input terminal and a point of reference D.C. potential, and means for connecting a deflection wave utilization means between said end terminal and a first tap on said transformer winding intermediate said input and end terminals thereof;

a voltage supply comprising the combination of:

a damper diode having a cathode connected to said first tap and an anode connected to a point of positive D.C. potential relative to said reference D.C. potential;

a first capacitor connected between said damper diode anode and said end terminal, periodic conduction of said damper diode developing a charge across said first capacitor;

an additional diode having anode and cathode electrodes;

means for connecting the anode electrode of said additional diode to a second tap on said transformer winding located intermediate said first tap and said end terminal;

a second capacitor connected between the cathode electrode of said additional diode and said end terminal, periodic conduction of said additional diode developing a charge across said second capacitor of a magnitude not exceeding the magnitude of the charge developed across said first capacitor;

and means for utilizing the junction of said additional diode and said second capacitor as a voltage supply output terminal providing an output D.C. potential equivalent to the sum of said positive D.C. potential, the charge across said first capacitor and the charge across said second capacitor.

2. In combination with a cathode ray tube deflection circuit including a source of horizontal deflection waves, a horizontal deflection wave transformer comprising a winding including an input terminal and an end terminal, said deflection wave source being coupled between said input terminal and a point of reference D.C. potential, means for connecting a deflection wave utilization means between said end terminal and a first tap on said transformer winding intermediate said input and end terminals thereof;

apparatus comprising the combination of:

a damper diode having a cathode connected to said first tap and an anode connected to a point of positive D.C. potential relative to said reference D.C. potential;

a first capacitor connected between said damper diode anode and said end terminal, periodic conduction of said damper diode developing a charge across said first capacitor;

an additional diode having anode and cathode electrodes;

means for connecting the anode electrode of said additional diode to a second tap on said transformer winding located intermediate said first tap and said end terminal;

a second capacitor connected between the cathode electrode of said additional diode and said end terminal, periodic conduction of said additional diode developing a charge across said second capacitor;

a vertical deflection wave generator including a discharge tube having an output electrode, a third capacitor, and means for coupling said third capacitor between said output electrode and a point of said reference D.C. potential;

and means for charging said third capacitor comprising resistive means for coupling the junction of said additional diode and said second capacitor to said third capacitor.

3. In combination with a cathode ray tube having a screen grid electrode, a deflection circuit including a source of deflection waves, a deflection wave transformer comprising a winding including an input terminal and an end terminal, said deflection wave source being coupled between said input terminal and a point of reference D.C. potential, and means for connecting a deflection wave utilization means between said end terminal and a first tap on said transformer winding intermediate said input and end terminals thereof;

apparatus comprising the combination of:

a damper diode having a cathode connected to said first tap and an anode connected to a point of positive D.C. potential relative to said reference D.C. potential;

a first capacitor connected between said damper diode anode and said end terminal, periodic conduction of said damper diode developing a charge across said first capacitor;

an additional diode having anode and cathode electrodes:

means for connecting the anode electrode of said additional diode to a second tap on said transformer winding located intermediate said first tap and said end terminal;

a second capacitor connected between the cathode electrode of said additional diode and said end terminal, periodic conduction of said additional diode developing a charge across said second capacitor, whereby the potential at the junction of said additional diode and said second capacitor, relative to said reference D.C. potential, is equivalent to the sum of said positive D.C. potential, the charge across said first capacitor and the charge across said second capacitor;

and means providing a direct current conductive connection between said screen grid electrode and said junction.

4. In a color television receiver including a color kinescope having a screen grid electrode, a line frequency deflection wave output transformer subject to the periodic development of flyback pulses, a power recovery circuit including a unilaterally conductive damper device effectively coupled across a winding section of said output transformer for developing a B-boost voltage, a kinescope beam focus adjuster responding to said flyback pulses derived from a pulse takeoff terminal on said winding section, and a field frequency deflection wave generator including a capacitor charging circuit;

apparatus comprising the combination of:

means including a filter capacitor for rectifying the flyback pulses appearing at said pulse takeoff terminal to develop a unidirectional voltage across said filter capacitor;

means including a connection from said field frequency deflection wave generator to said rectifying means for utilizing said unidirectional potential in series aiding relationship with said B-boost voltage as a charging potential for said capacitor charging circuit; and means including a connection from said screen grid electrode to said rectifying means for utilizing said unidirectional potential in series aiding relationship with said B-boost voltage to supply an energizing potential to said screen grid electrode.

References Cited by the Examiner

UNITED STATES PATENTS

| | | | |
|---|---|---|---|
| 2,879,447 | 3/59 | Preisig | 315—22 |

OTHER REFERENCES

IRE Dictionary of Electronics Terms and Symbols, Institute of Radio Engineers, New York, 1961, p. 130.

DAVID G. REDINBAUGH, *Primary Examiner.*